Feb. 2, 1926.
J. F. O'CONNOR
1,571,683
ANTIFRICTION SIDE BEARING
Filed Jan. 5, 1923
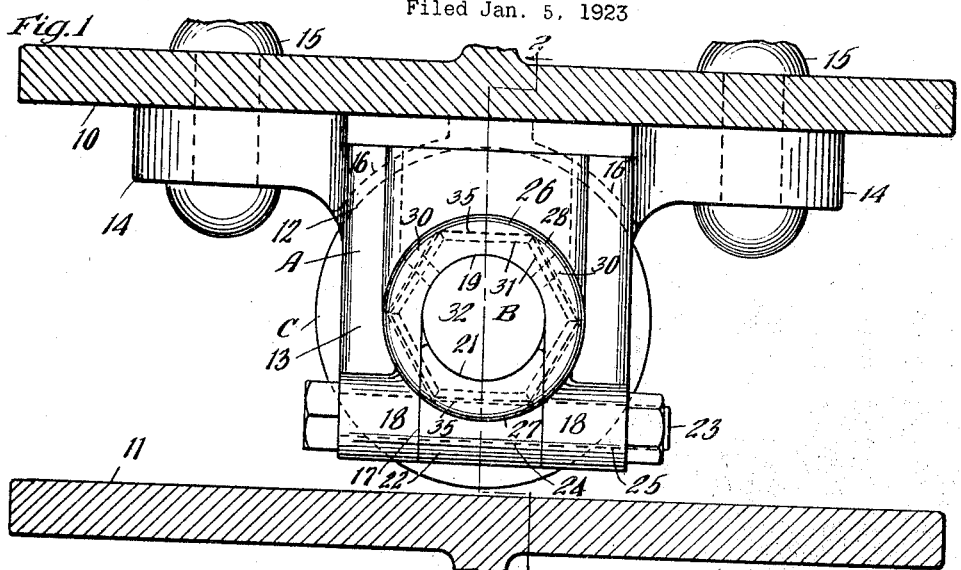
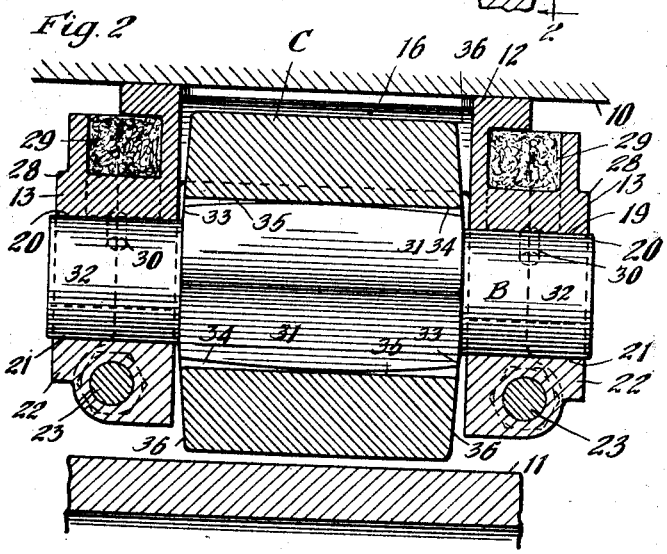
Witnesses
Wm. Geiger
Inventor
John F. O'Connor
By George J. Haight
His Atty.

Patented Feb. 2, 1926.

1,571,683

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

ANTIFRICTION SIDE BEARING.

Application filed January 5, 1923. Serial No. 610,756.

*To all whom it may concern:*

Be it known that I, JOHN F. O'CONNOR, a citizen of the United States, residing at Chicago, in the county of Cook and State of Illinois, have invented a certain new and useful Improvement in Antifriction Side Bearings, of which the following is a full, clear, concise, and exact description, reference being had to the accompanying drawings, forming a part of this specification.

This invention relates to improvements in anti-friction side bearings.

An object of the invention is to provide an anti-friction side bearing, of exceedingly simple, economical and strong construction adapted especially for service with very heavy railway equipment, wherein the anti-friction roller is mounted on a shaft rotatably journaled in a housing secured to either the body or truck bolster, and wherein the roller has limited rocking movement on the shaft to automatically effect alinement between the roller and the bolster on which the roller bears.

Another object of the invention is to provide a side bearing of the type specified with means for lubricating the journal portions of the shaft, which supports the anti-friction roller.

In the drawing forming a part of this specification, Fig. 1 is a vertical sectional view taken parallel to the center line of the car, through the ends of the body and truck bolsters, showing my improvements in connection therewith. Fig. 2 is a sectional view taken substantially on the line 2—2 of Fig. 1, showing in side elevation the shaft on which the roller is mounted.

In said drawings, 10 denotes the under side of a body bolster and 11, the upper portion of the opposite truck bolster. In the instance shown my improved side bearing is applied to the body bolster. As shown the side bearing comprises, broadly, a retaining member or housing A, a supporting shaft B, and an anti-friction element proper or roller C.

The retaining member A, as shown, comprises a main body portion 12, depending, spaced, relatively thick side arms 13, and perforated end lugs 14 by which the retaining member is adapted to be rigidly secured to the body bolster as by rivets 15. The central portion of the lower face of the body member 12 is cut away on a curve as indicated by 16 to provide clearance for the roller C. The side arms 13 are provided with alined recesses 17, each having spaced apart parallel side walls 18 extending upwardly from the bottom thereof and terminating in a curved upper wall 19 forming one-half of the bearing 20 for the shaft B. The lower half of each bearing 20 is formed by the concave upper face 21 of a bearing block 22 removably received in and fitting the lower portion of the recesses 17. The bearing blocks 22 are adapted to be held in assembled relation with the respective side arms 13 by bolts 23 received in alined recesses 24 and 25 in the blocks 22 and the arms 13, respectively. The arms 13 and the bearing blocks 22 have thickened portions 26 and 27 adjacent the bearing openings defined by the curved surfaces 19 and 21 respectively, to provide bosses 28 when the parts are in assembled relation, thereby forming wide bearing surfaces for the ends of the shaft B. At their upper ends the arms 13 are provided with outwardly opening undercut recesses 29, which are adapted to serve as reservoirs for a lubricant. Communication is established between the recesses 29 and the bearings 20 by ducts 30 extending downwardly from the bottoms of said recesses and terminating at the curved walls 19. The recesses 29 are filled with waste or any other suitable material for holding the oil.

The shaft B comprises a main body portion 31 of hexagonal cross section and reduced cylindrical end portions 32 journaled in the bearings 20. The body portion 31 is of greatest thickness at the center thereof and tapers outwardly therefrom in opposite directions to its opposite ends, the faces 31 being curved slightly longitudinally of the body portion of the shaft B as clearly shown in Fig. 2. The shoulders 33 formed between the body portion 31 and the reduced ends 32 prevent longitudinal movement or displacement of the shaft B in the bearings 20.

The anti-friction roller C is mounted on the enlarged portion 31 of the shaft B between the arms 13 of the housing A, and, being provided with a bore 34 of hexagonal section of the same size throughout and slightly larger than the central portion of the enlargement 31 of the shaft B, is adapted to loosely receive the hexagonal body portion of the shaft to permit rocking movement of the roller C thereon. Flat or plain bearing faces 35 are thereby provided on the interior of the bore 34 as clearly shown in Fig. 3, which faces co-act with the curved faces 32 of the enlarged portion 31 of the shaft B, thereby providing large bearing surfaces for the relative rocking movement of the shaft and the roller C, in the alining operation. As shown in Fig. 2, the roller C is gradually reduced in width from the opening 34 to its periphery, by the side faces being cut away on curved lines as indicated at 36, to provide proper clearance between the inner faces of the arms and the side faces of the roller and permit the desired rocking movement.

In assembling the parts of my improved side bearing, the enlarged portion of the shaft B is first inserted in the bore of the roller. The shaft B is then assembled with the retaining member A by inserting the ends 32 thereof through the open bottom ends of the openings 18, and passing the same upwardly therein and then placing in position, bearing blocks 22 which form the lower halves of the bearings, and finally securing the blocks in place by the bolts 23.

In the operation of my improved side bearing, when the two bolsters 10 and 11 approach each other, the load will be taken by the roller C, and transmitted through the shaft B to the housing A secured to the body bolster. As the two bolsters 10 and 11 shift relatively to each other in circular paths, the roller rolls over the upper surface of the truck bolster 11, turning the shaft B therewith in the bearings 20, due to the driving engagement between the hexagonal portion of the shaft and the hexagonal bore in the roller. During this movement the relative tilting of the bolsters 10 and 11 will cause the roller to adjust itself on the shaft in a direction longitudinally of the axis thereof, thereby maintaining the bearing face of the roller in alinement with the upper face of the truck bolster and preserving full line contact.

From the preceding description taken in connection with the drawing, it will be evident that the lubricating of the bearings 20 reduces the friction to a minimum.

I have herein shown and described what I now consider the preferred manner of carrying out the invention but, as will be obvious to those skilled in the art, various changes and modifications may be made without departing from the main details of the invention and such changes and modifications are contemplated that come within the scope of the claims appended hereto.

I claim:

1. In an anti-friction bearing adapted for attachment to the bolster of a car, the combination with a retaining member; of a shaft rotatably mounted in said retaining member, said shaft being provided with a portion of non-circular cross section; and a roller having an opening of non-circular cross section adapted to receive said portion of the shaft with rotary driving relation, said roller and shaft also having limited relative rocking movement.

2. In an anti-friction bearing adapted for attachment to a bolster or the like; the combination with a retaining member; of a shaft rotatably mounted in said retaining member, said shaft being provided with a portion having a plurality of bearing faces; and a roller having an opening therein provided with a plurality of interior bearing faces adapted to engage corresponding faces of said shaft.

3. In an anti-friction bearing adapted for attachment to the bolster of a car, the combination with a retaining member; of a shaft rotatably mounted in said retaining member, said shaft being provided with a plurality of longitudinally curved bearing surfaces; and a roller mounted on said shaft, said roller being provided with a plurality of plain interior bearing surfaces adapted to engage corresponding surfaces of said shaft in longitudinally rocking and rotary driving relation.

4. In an anti-friction bearing adapted for attachment to the bolster of a car, the combination with a retaining member having a pair of spaced bearing members; of a shaft having its ends rotatably mounted in said bearing members, said shaft being provided with a portion of non-circular cross section; a roller having an opening of non-circular cross-section adapted to receive said portion of said shaft in rotary driving relation, said roller and the shaft having limited rocking movement on each other; and means for lubricating said bearing members.

In witness that I claim the foregoing I have hereunto subscribed my name this 2nd day of January 1923.

JOHN F. O'CONNOR.